United States Patent [19]

Gescheidle et al.

[11] Patent Number: 4,867,580
[45] Date of Patent: Sep. 19, 1989

[54] BEARING TAKE-UP FRAME

[75] Inventors: Gregory A. Gescheidle, Lisle; Steven S. Williams, Des Plaines, both of Ill.

[73] Assignee: Rexnord Corporation, Milwaukee, Wis.

[21] Appl. No.: 293,113

[22] Filed: Jan. 3, 1989

[51] Int. Cl.[4] .............................................. F16C 25/02
[52] U.S. Cl. .................................... 384/252; 384/247; 384/258
[58] Field of Search ............... 384/247, 252, 258, 260, 384/249, 269

[56] References Cited

U.S. PATENT DOCUMENTS

| 1,167,672 | 1/1916 | Barny | 384/258 |
| 4,325,588 | 4/1982 | Elliott, Jr. | |
| 4,669,325 | 6/1987 | Nishikawa et al. | 384/252 |
| 4,676,670 | 6/1987 | Nisley | 384/247 |

Primary Examiner—Lenard A. Footland
Attorney, Agent, or Firm—Michael, Best & Friedrich

[57] ABSTRACT

A bearing take-up apparatus is provided which allows easy removal of a bearing block supported by the bearing take up apparatus. Two slotted end walls extend from a base to support the threaded rod used with the bearing block and to prevent lateral movement of the rod. A covering piece has holes in one of its ends, which line up with a hole in an end wall. A throughbolt secures the covering piece to at least one of the slotted endwalls via holes in the endwalls, so that the throughbolt forms a hinge for the cover piece, when the other end of the covering piece is released. The threaded rod can be lifted and the bearing removed, when the cover piece is hinged upwards, about the throughbolt. The cover piece includes components to hold the threaded rod down when the cover piece is secured at both of its ends.

10 Claims, 1 Drawing Sheet

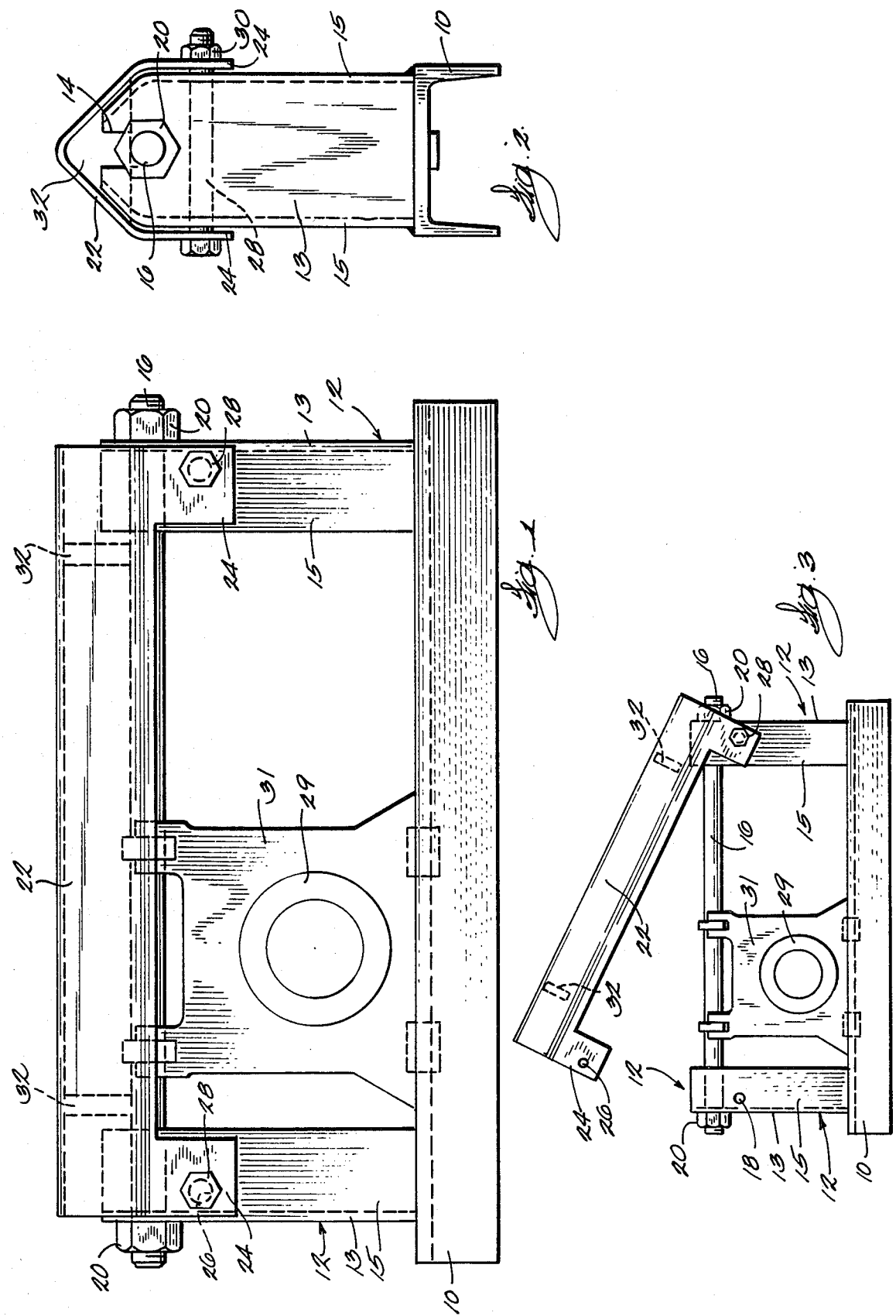

BEARING TAKE-UP FRAME

FIELD OF THE INVENTION

The present invention relates to a bearing take-up apparatus, and more particularly to a bearing take-up apparatus which is adapted to allow easy removal of a bearing block supported by the bearing take-up apparatus.

BACKGROUND PRIOR ART

A prior art bearing take-up apparatus is illustrated in U.S. Pat. No. 4,325,588 to Elliot, Jr. et al., issued on Apr. 20, 1982 and includes a rigid base having spaced upwardly extending walls between which a bearing housing having recesses in its upper surface is slideably received. A threaded screw having anchoring means rigidly secured on its ends and nuts intermediate its ends is lowered onto upper surfaces of the end walls with the nuts positioned to be received within the recesses while the anchoring means overhang the end walls. A cover is lowered over the screw and connecting means are provided for releaseably connecting the cover to the end walls.

The prior art does not provide a bearing take-up apparatus which permits quick and simple removal of the bearing block. Prior art designs generally require the removal of at least several bolts before a covering element can be removed, and so that a threaded rod can then be lifted and the bearing removed.

SUMMARY OF THE INVENTION

The invention provides a bearing take-up apparatus which facilitates more convenient removal of a bearing block to permit lubrication, repair or replacement of a bearing supported by the take-up apparatus.

More specifically, the invention provides, in one embodiment, a base, and to opposed, spaced apart support walls extending upwardly from the base, the support walls each having slots for receiving and supporting a threaded rod, and for preventing lateral movement of the rod. At least one of the support walls has a hole through it which is generally transverse to the rod when the rod is in Place. Means are provided for limiting movement of the rod in the direction of the longitudinal axis of the rod. An elongated cover piece having opposite ends is supported above the threaded rod, and covers the threaded rod, and has at least one hole through it aligned with the hole through the support wall. Means such as a throughbolt releaseably secure one of the opposite ends of the cover piece to one of the support walls, and means secure the other of the opposite ends of the cover piece to the other of the support walls to allow pivotal movement of the cover piece between a bearing block retaining position and a bearing block release position.

These and other features, objects, and advantages of the invention will become apparent to those of ordinary skill in the art from the following description of the preferred embodiment of the invention, which is given by way of example, reference being made to the accompanying drawings.

BRIEF DESCRIPTION OF THE VIEWS OF THE DRAWINGS

FIG. 1 is a front elevation view showing one embodiment of the invention in bearing block retaining position.

FIG. 2 is an end view of the bearing take-up frame shown in FIG. 1.

FIG. 3 is a front elevation view showing the bearing take-up frame of FIG. 1 in bearing block release position.

DETAILED DESCRIPTION OF THE PREFERRED EMBODIMENT

FIG. 1 illustrates a bearing take-up frame embodying the invention and including a base 10, and support walls 12 which are fixed to the base 10 and extend generally vertically upwardly from opposite ends of the base. While the support walls 12 could have other constructions, in the illustrated arrangement, the support walls 12 are each generally U-shaped in horizontal cross-section and each include a transverse bite portion 13 and a pair of side walls 15. A slot 14 is provided in the top of the transverse bite portion of each support wall 12 to receive threaded rod 16 and to prevent downward or lateral movement of the rod 16. The side walls 15 of each support wall 12 include aligned apertures 18, the apertures 18 being aligned such that they define an axis which is horizontal and generally Perpendicular to that formed by the threaded rod 16.

Movement limiting means 20 are provided on either end of rod 16 to prevent substantial axial movement of the rod 16 with respect to the end walls 12 after the threaded rod 16 is lowered into the slots 14 of the support walls 12. While the movement limiting means could be other structure, in the illustrated arrangement nuts 20 are provided on opposite ends of the threaded rod 16 and are adapted to engage the end walls 12. The nuts 20 can be mounted on rod 16 either before or after it is lowered into place.

Covering piece 22 has a major portion comprising a channel having the shape of an inverted "V" in cross section, as can be seen from FIG. 2, and has legs 24 extending vertically downward from either of its ends. The legs 24 are adapted to be Positioned against and overlie the sidewalls 15 of the upwardly projecting support walls 12, and the legs 24 have apertures 26 adapted to be aligned with the apertures 18 in the side walls of the support walls 12, so that each end of the covering piece 22 can be fastened by a throughbolt 28 to the corresponding support wall 12. Covering piece 22 can be pivoted about either throughbolt 28, when the other throughbolt is removed, to allow the threaded rod 16 to be lifted from the support walls 12 so that the bearing block 29 supported by the adjusting frame 31 can be removed. Thus, the bearing block 29 can be removed for maintenance or replacement of the bearing by removing a single throughbolt. The covering piece 22 further includes threaded rod hold down means 32 to prevent substantial upward movement of rod 16 when covering piece 22 is bolted to both support walls 12.

Thus, the preferred embodiment of the invention allows the threaded rod to be more easily removed, from either end of the take-up frame, and provides for simplified assembly and a reduced number of parts.

While a preferred embodiment has been disclosed by way of example, it should be understood that certain modifications will be apparent to those of ordinary skill in the art. For example, the shape of the covering piece 22 could be modified, providing that it can be pivoted to allow removal of the threaded rod and further providing that it prevent upward movement of the threaded rod. Either throughbolt could be replaced with other fastening means of the type allowing pivoting of the cover piece 22. For example, a pair of rivets could be used on one end, while a throughbolt is used at the other end. Additionally, the support walls could be of a shape other than that illustrated, and could, for example, have a single aperture passing all the way therethrough or could have axially aligned apertures through extensions thereof provided that they allow the covering piece to be releaseably fastened at one end thereof and hinged at the other end thereof, and further provided that they can support the threaded rod and Prevent substantial lateral movement thereof. Thus, the scope of the invention should be limited only by the scope and spirit of the appended claims.

We claim:

1. A bearing take-up frame comprising:

a base, two opposed, spaced apart support walls extending upwardly from said base, said support walls each including upper ends having slots therein for slideably receiving and supporting a threaded rod and for preventing lateral movement of the threaded rod, at least one of said support walls having at least one aperture therethrough, said aperture having a longitudinal axis which is generally transverse to said threaded rod when the threaded rod is in place, a threaded rod having a longitudinal axis and opposite ends, one end of the threaded rod supported in the slot in one of the support walls and an opposite end supported in the slot in another of the support walls, means for limiting movement of the threaded rod in the direction of the longitudinal axis of the threaded rod, an elongated cover piece supported above the threaded rod and covering the threaded rod, the elongated cover piece having at least one aperture therethrough aligned with said one aperture through said support wall, and the cover piece having opposite ends, said cover piece including downwardly extending hold-down means to prevent upward movement of said rod, and means for releaseably securing one of the opposite ends of the cover piece to one of the support walls and means for securing the other of the opposite ends of the cover piece to the other of the support walls, the means for securing one of the opposite ends of the cover piece including means for supporting the cover piece for pivotal movement between a bearing block retaining position wherein each end of the cover piece is secured to the end wall, and a bearing block release position wherein the releaseably secured end of the cover plate is released and raised, the means for releaseably securing one of the opposite ends comprising a bolt extending through said aperture through said at least one support wall and said aperture through said covering piece, said bolt being generally transverse to the longitudinal axis of said threaded rod.

2. The bearing take-up frame of claim 1 wherein said cover piece has a main portion which is generally of the shape of an inverted V, in cross-section with legs extending generally vertically and downwardly therefrom at the ends thereof.

3. The bearing take-up frame of claim 2 wherein said legs are pieces of metal sheet welded to said main portion.

4. The bearing take-up frame of claim 3 wherein said pieces of metal sheet are welded to said cover piece at locations therein proximate to said end walls, when said covering piece is bolted to both of said end walls.

5. The bearing take-up frame of claim 2 wherein said hold-down means comprises at least two pieces of metal sheet of a generally triangular shape, said shape corresponding to the shape of said cover piece, said Pieces of metal sheet being welded to said cover piece.

6. A bearing take-up frame comprising:

a base, two opposed, spaced apart support walls extending upwardly from said base, said support walls being generally U-shaped in horizontal cross-section and each including a bite portion and a pair of side walls, said support walls each having slots in their bite portions for slideably receiving and supporting a threaded rod and for preventing lateral movement of the threaded rod, each of said support walls having a pair of radially aligned apertures through said sidewalls, said pair of apertures having a common longitudinal axis which is generally transverse to said rod when the rod is in place, a threaded rod having a longitudinal axis and opposite ends, one end of the threaded rod supported in the slot in one of the support walls and an opposite end supported in the slot in another of the support walls, means for limiting movement of the rod in the direction of the longitudinal axis of the rod, an elongated cover piece supported above the threaded rod and covering the threaded rod having legs at either end thereof, said legs including apertures therethrough aligned with said apertures through said side walls, the cover piece having opposite ends, said cover piece including downwardly extending hold-down means to prevent upward movement of said rod, and means for releaseably securing each of the opposite ends of the cover piece to each of the support walls for supporting the cover piece for pivotal movement between a bearing block retaining position wherein each end of the cover piece is secured to one of the end walls, and a bearing block release position wherein one of the releaseably secured ends of the cover plate is released and raised, the means for releaseably securing said opposite ends comprising a bolt extending through said radially aligned apertures through said sidewalls and through said legs of said covering piece, said bolt being generally transverse to the longitudinal axis of said threaded rod.

7. The bearing take-up frame of claim 6 wherein said cover piece has a main portion which is generally of the shape of an inverted V, in cross-section with said legs extending generally vertically and downwardly therefrom at the ends thereof.

8. The bearing take-up frame of claim 7 wherein said legs are pieces of metal sheet welded to said main portion.

9. The bearing take-up frame of claim 8 wherein said pieces of metal sheet are welded to said covering piece at locations therein proximate to said end walls, when said cover piece is bolted to both of said end walls.

10. The bearing take-up frame of claim 7 wherein said hold-down means comprises at least two pieces of metal sheet of a generally triangular shape, said shape corresponding to the shape of said cover piece, said pieces of metal sheet being welded to said cover piece.

* * * * *